(12) United States Patent
Usui

(10) Patent No.: US 7,278,661 B2
(45) Date of Patent: Oct. 9, 2007

(54) CONNECTING STRUCTURE OF BRANCH CONNECTOR IN FUEL PRESSURE ACCUMULATING CONTAINER

(75) Inventor: Masayoshi Usui, Numazu (JP)

(73) Assignee: Usui Kokusai Sangyo Kaisha Limited (JP)

( * ) Notice: Subject to any disclaimer, the term of this patent is extended or adjusted under 35 U.S.C. 154(b) by 0 days.

(21) Appl. No.: 11/020,516

(22) Filed: Dec. 23, 2004

(65) Prior Publication Data

US 2005/0200120 A1 Sep. 15, 2005

Related U.S. Application Data

(62) Division of application No. 10/320,855, filed on Dec. 16, 2002, now Pat. No. 6,929,288.

(30) Foreign Application Priority Data

Dec. 20, 2001 (JP) .............. 2001-387366
Jan. 21, 2002 (JP) .............. 2002-11772

(51) Int. Cl.
  *F16L 5/00* (2006.01)
(52) U.S. Cl. .............. 285/189; 285/125.1; 285/288.1
(58) Field of Classification Search .............. 285/125.1, 285/288.1, 222, 211, 201
See application file for complete search history.

(56) References Cited

U.S. PATENT DOCUMENTS

| | | | |
|---|---|---|---|
| 1,093,997 A * | 4/1914 | Kaus .............. | 285/288.1 |
| 1,246,456 A * | 11/1917 | Parpet .............. | 29/890.15 |
| 1,857,912 A | 5/1932 | Jones | |
| 1,964,100 A | 6/1934 | Wang | |
| 2,886,881 A * | 5/1959 | Huet .............. | 285/288.1 |
| 3,239,192 A * | 3/1966 | Totten .............. | 285/211 |
| 3,827,729 A * | 8/1974 | Kamen .............. | 285/201 |
| 3,934,787 A * | 1/1976 | Fels .............. | 285/189 |
| 3,998,376 A * | 12/1976 | Haines .............. | 228/154 |
| 4,159,741 A * | 7/1979 | Nonnenmann et al. ..... | 285/222 |
| 4,648,811 A | 3/1987 | Tahata et al. | |
| 4,856,824 A | 8/1989 | Clausen | |
| 5,580,104 A | 12/1996 | Stallard, III | |
| 6,089,617 A | 7/2000 | Craig et al. | |

FOREIGN PATENT DOCUMENTS

| | | |
|---|---|---|
| JP | 9-280457 | 10/1997 |
| JP | 9-280458 | 10/1997 |
| JP | 9-280459 | 10/1997 |
| JP | 9-280464 | 10/1997 |
| JP | 9-287687 | 11/1997 |
| JP | 10-110883 | 4/1998 |
| JP | 10-176783 | 6/1998 |
| JP | 10-176784 | 6/1998 |

* cited by examiner

*Primary Examiner*—Aaron Dunwoody
(74) *Attorney, Agent, or Firm*—Gerald E. Hespos; Anthony J. Casella

(57) ABSTRACT

A branch connector in a fuel pressure accumulating container is joined with a through hole formed on a peripheral wall of the pressure accumulating container. The branch connector is inserted deeply into the through hole until the distal end of the branch connector is projected from the inner peripheral wall surface of the pressure accumulating container. Thus, the internal pressure fatigue strength is improved by lowering the maximum stress value generated at the internal peripheral edge at the lower end of the branch connector.

12 Claims, 15 Drawing Sheets

CONNECTING STRUCTURE OF BRANCH CONNECTOR IN FUEL PRESSURE ACCUMULATING CONTAINER

This application is a divisional of application Ser. No. 10/320,855 now U.S. Pat. No. 6,929,288.

BACKGROUND OF THE INVENTION

1. Field of the Invention

The present invention relates to a connecting structure of a branch connector formed of a branch pipe or a joint fixture in a cylindrical fuel pressure accumulating container or a spherical fuel pressure accumulating container such as a high-pressure fuel manifold and a high-pressure fuel block, and, more specifically, to a connecting structure of a branch connector in a fuel pressure accumulating container for supplying a high-pressure fuel not less than 1000 kgf/cm² in a diesel internal combustion engine.

2. Description of the Related Art

The cylindrical fuel pressure accumulating container having a cylindrical inner peripheral wall surface includes an cylindrical container 111 having a flow path 111-1 therein, which corresponds to the cylindrical fuel pressure container, and branch pipes 112, which corresponds to the branch connector, connected to the cylindrical container 111 directly or via a joint fixture or the like as shown in FIG. 22 as an example. On the other hand, the spherical fuel pressure accumulating container having at least partly a spherical inner peripheral wall surface includes a spherical container 121 having a spherical space 121-1 therein, which corresponds to the spherical fuel container, and the branch pipe 112, which corresponds to the branch connector, connected to the spherical container 121 directly or via a joint fixture or the like as shown in FIG. 23 as an example. The structure of the spherical container 121 is such that, as shown in the figure, an upper half body 121a and a lower half body 121b having semi-spherical recesses respectively therein are fixedly connected by a bolt 121c. Reference numeral 121d designates a sealing packing.

The connecting structure of the branch connector in the cylindrical fuel pressure accumulating container shown in FIG. 22 includes a connecting structure in which a connecting end 112-1 of the branch pipe 112, which has the same diameter as the branch pipe 112 itself, is joined (by means of brazing or the like) with through holes 111-2 communicated with the flow path formed on the peripheral wall of the cylindrical container 111 in a state of being fitted therein, and a structure in which the connecting end 114-1 of the branch joint fixture 114 is joined (by means of brazing or the like) with through hole 111-2 in a state of being inserted therein, and the branch pipe 112 is connected to branch joint fixture 114 by a nut 115 as shown in FIG. 24.

The connecting structure of the branch connector in the spherical fuel pressure accumulating container shown in FIG. 23 includes a connecting structure in which the connecting end 112-1 of the branch pipe 112, which has the same diameter as the branch pipe 112 itself, is joined (by means of brazing or the like) with through holes 121-2 communicated with the space 121-1 formed on the peripheral wall of the spherical container 121 in a state of being fitted therein, and a structure in which the connecting end 114-1 of the branch joint fixture 114 is joined (by means of brazing or the like) with the through hole 121-2, as shown in FIG. 25 in a state of being fitted therein, and the branch pipe 112 is connected to branch joint fixture 114 by a nut 115.

In the case of the connecting structure of the branch connector in the cylindrical fuel pressure accumulating container, the distal end of the branch pipe 112 or the branch joint fixture 114 may be fitted into and joined with the through hole 111-2 in such a manner that the branch pipe 112 or the branch joint fixture 114 is fitted so that the outer peripheral edge 112a or 114a of the branch pipe 112 or the branch joint fixture 114 comes into contact with the inner wall of the through hole 111-2 and a recess 111-3 is formed at the opening of the through hole 111-2.

However, in such connecting structure, a large stress is generated at the opening end P of the branch connector, such as the branch pipe 112 and the branch joint fixture 114 communicating with the pressure accumulating container, due to constantly repeated abrupt variations in supplied pressure of the high-pressure fluid not less than 1000 kgf/cm², and, especially variations in relative dimensions between the mating members (mating bearing surfaces) due to vibrations applied by an engine and increase and decrease of ambient temperature, and thus it is susceptible to cracking originating from the opening end P, which may results in leakage of fuel or the like from time to time. In the case of the cylindrical fuel pressure accumulating container, as shown in FIG. 22B, a large stress is generated at two opening ends P aligned in the axial direction.

Therefore, the following countermeasures are generally taken. In order to increase fatigue strength at the opening end of the branch connector communicating with the pressure accumulating container due to internal pressure, a method of employing a high-strength steel, there are a method, of increasing the strength of material by heat treatment including carbonitriding and the like, a method of employing a forged type or an assembled type (eye-joint type) as a pressure accumulating container, and so on.

However, with the method of employing high-strength steel as a branch connector such as the branch pipe and the joint fixture, there is a problem in durability since the high-strength steel is very hard to weld, and cannot be hardened. by heat processing. With the method of enhancing the strength of material by heat treatment including carbonitriding and the like, there is a drawback in that the strength cannot be enhanced because brazing filler metal of the brazed article is deteriorated by heat treatment in a furnace, and thus it is intolerable to be used in a high-pressure application. In addition, the forged type or the assembled type is disadvantageously heavy in weight and expensive.

In view of the problems of the related art described above, the invention provides a connecting structure of the branch connector in the fuel pressure accumulating container capable of increasing the internal pressure fatigue strength by lowering the maximum stress value generated at the inner periphery of the lower end of the branch connector such as the branch pipe and the joint fixture.

SUMMARY OF THE INVENTION

The invention provides a connecting structure of a branch connector in a cylindrical fuel pressure accumulating container or a spherical fuel pressure accumulating container including at least a through hole formed on an axially extending peripheral wall or on a peripheral wall of a cylindrical container or a spherical container that communicates with the internal flow path of a fuel container having a cylindrical or spherical inner peripheral curved wall surface, and a branch connector such as a branch pipe and a branch joint fixture joined with the through hole in a state of being inserted therein, wherein the branch connector is inserted deeply until the distal end thereof is projected from the inner peripheral wall surface of the container into the flow path or into the container.

The invention provides a connecting structure of a branch connector in a cylindrical fuel pressure accumulating container or a spherical fuel pressure accumulating container comprising at least a through hole formed on an axially extending cylindrical peripheral wall surface or a spherical peripheral wall of a cylindrical container or a spherical container in a cylindrical fuel container that communicate with the flow oath of a fuel container having at least partly a cylindrical inner peripheral wall surface or a spherical fuel container having at least partly a spherical inner peripheral curved wall surface, and a branch connector including a branch pipe or a branch joint fixture being jointed with the through hole in a state of being inserted into the through hole wherein a flat surface is formed on the inner peripheral wall surface at least at the axial position of the through hole in abutment with the through hole, and the branch connector is inserted deeply into the through hole until the distal end thereof is projected from the inner peripheral wall surface into the flow path or into the container.

According to the invention, the length L of the distal end of the branch connector from the inner peripheral wall surface of the pressure accumulating container into the flow path is preferably not less than the thickness t of the branch connector, the branch connector is preferably formed with a integrally formed or a separately formed enlarge diameter portion at the position that comes into abutment with the outer peripheral surface of the pressure accumulating container, the distal end portion of the branch connector such as the branch pipe or the branch joint fixture is preferably reduced in inner diameter to obtain the orifice effect, and the through hole preferably has a tapered shape that increases in diameter toward the inner peripheral surface of the pressure accumulating container.

The invention further provide a connecting structure of the branch connector in the cylindrical or the spherical fuel pressure accumulating container including a burring wall formed at the inner opening end of the through hole, wherein the branch connector is inserted deeply into the through hole until the distal end thereof is projected from the burring wall into the flow path, and wherein a flat surface continuing into the burring wall on the inner peripheral wall surface around the base portion of the burring wall being provided.

In the invention, the branch connector may be joined by brazing, or diffusion bonding, after the branch connector is press-fitted, shrink-fitted, or cool-fitted.

The terms, "cylindrical fuel container" and "spherical fuel container" used in the invention mean that the shapes of the inner peripheral surface of the pressure accumulating containers are cylindrical and spherical, respectively, and do not express the appearance of the pressure accumulating containers. It is needless to say that there are pressure accumulating containers having almost the similar shapes as those of the inner peripheral surfaces.

In other words, the invention is intended to lower the maximum value of tensile stress generated at the inner peripheral edge of the lower end on the branch connector such as the branch pipe and the joint fixture by inserting the distal end of the branch connector deeply through the inner peripheral wall surface of the cylindrical container or the spherical container until it is projected into the flow path so that a fatigue stress generated at the peripheral edge at the lower end of the branch connector such as the branch pipe and the joint fixture is reduced by counterbalancing the internal pressure and the external pressure applied to the projected portion. The joint portion (brazed portion or the portion joined by diffusing bonding) between the branch connector and the cylindrical container or the spherical container is applied with a pressure from the side of the flow path of the branch connector through the wall of the branch connector to strengthen the joint portion.

The invention is further intended to prevent generation of stress-concentrated point such as conventional point P (in the case of the cylindrical container it may be generated along the axial direction and thus it has directionality, while in case of the spherical container, it may be generated over a whole periphery of the through hole because it has no directionality) by employing a system to provide the flat surface on the inner peripheral wall surface of the cylindrical container or the spherical container so as to be in abutment with the joint through hole, and connect the branch connector into the through hole formed go as to be in abutment with the flat surface.

The invention is still further intended to reduce a fatigue stress generated at the inner peripheral edge at the lower end of the branch connector such as the branch pipe and the joint fixture by inserting the distal end of the blanch connector deeply through the flat inner peripheral wall surface of the cylindrical container or the spherical container until it is projected into the flow path and counterbalancing the internal pressure and the external pressure applied to the projected portion, and to lower the maximum value of tensile stress generated at the inner peripheral edge of the lower end of the branch connector such as the branch pipe or the joint fixture by the action of stress decentralization associated with the shape effect of the flat inner peripheral wall surface.

In the invention, the length L of the projection of the distal end of the branch connector from the inner peripheral wall surface of the pressure accumulating container into the flow path may be short. However, actually, the length is preferably nod less than the thickness t of the branch connector in order to generate the external pressure as much as the internal pressure at the projection for balancing them. In other words, the reason is that it is preferable to settle length L of the projection to the value not less than the thickness t of the branch connector in order to reduce the fatigue stress generated at the inner peripheral edge of the lower end of the branch connector by balancing the internal pressure applied to the branch connector and the external pressure applied to the projection. The upper limit value of the length L of the projection is to be determined appropriately by taking the internal diameter, the thickness, and the like of the cylindrical container or the spherical container into account.

In the case of the cylindrical fuel container, a dimension W of the flat surface in the direction orthogonal to the axis is preferably larger than half a diameter d or the through hole, and not more than twice the diameter d of the through hole. On the other hand, in the case of the spherical fuel container, a dimension Y of the flat surface in the direction of radius of the through hole is preferably larger than 1.1 d times a diameter d of the through hole and not more than twice the diameter d of the through hole. The reason is that if the dimension w of the flat surface in the direction orthogonal to the axis in the case of the cylindrical fuel container, and the dimension Y of the flat surface in the direction of diameter of the through hole in the case of the spherical fuel container, is less than half a diameter d of the through hole and less than 1.1 d, respectively, the flat surface is too small to achieve sufficient action to decentralize a stress. On the other hand, the dimension W in the direction orthogonal to the axis and the dimension Y in the direction d the diameter of the through home exceed twice the diameter d of the through hole, respectively, there is no difference in effects, and it is difficult to mold.

A method of forming the flat surface that may be employed in the invention includes a method of forming a flat surface on the inner peripheral wall surface by applying a depressing pressure under the external pressure system, a method of forming a flat surface on the inner wall surface when forging, and a method of forming a flat surface during injection molding. In the method of forming a flat surface on the inner peripheral wall surface by applying a depressing pressure under the external pressure system, the flat surface may include an arcuate plane projecting inward. Therefore, the flat surface in the invention is not limited to a complete flat surface, and includes various curved shape such as the arcuate plane, a oval surface, and so on.

DETAILED DESCRIPTION OF PREFERRED EMBODIMENTS

Figure 1:
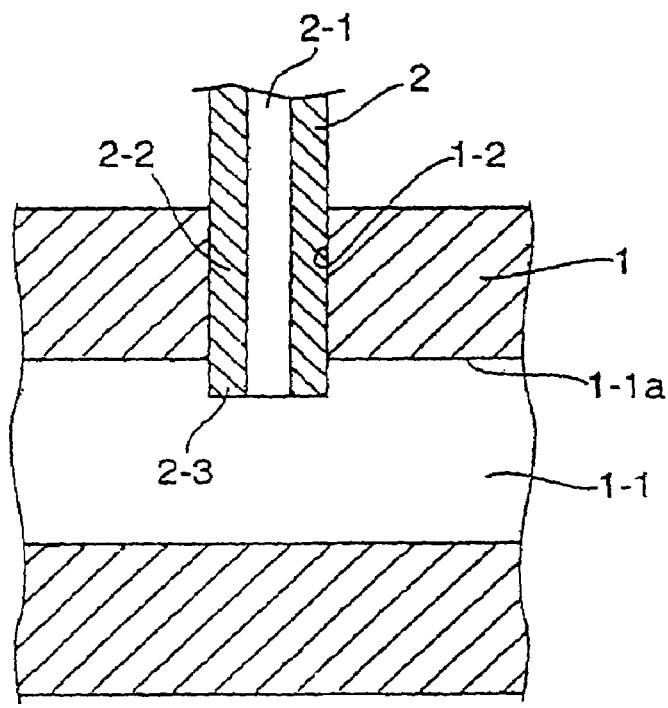
FIG. 1 is a cross sectional view showing a connecting portion using a branch pipe according to the connecting structure of a branch connector in a cylindrical fuel container having a cylindrical inner peripheral wall surface according to a first embodiment of the invention.

The cylindrical container 1, 11 having the cylindrical inner peripheral wall surface shown in FIG. 1 to FIG. 6 defines the flow path 1-1, 11-1 therein, and is formed of a thick steel pipe member having a diameter in the order of 30 m/m or less such as a high-pressure piping carbon steel pipe, a stainless steel pipe, or the like. The cylindrical container 1 shown in FIG. 1 and FIG. 2 has a single through hole 1-2 or a plurality of through holes 1-2 at intervals on the inner surface of the peripheral wall in the axial direction so as to communicate with the flow path 1-1. The cylindrical container 11 shown in FIG. 3 to FIG. 6 has a single flat surface 11-2 or a plurality of flat surfaces 11-2 at intervals on the inner surface of the peripheral wall in the circumferential or the axial direction so as to communicate with the flow path 11-1, and a single or plurality of through holes 11-3 are formed into abutment with the flat surfaces so that the centers of the through holes 11-3 substantially coincide with the axial centerlines of the flat surfaces.

The spherical container 21 having the spherical inner peripheral wall surface shown in FIG. 7 to FIG. 10 is formed with a space 21-1 having a spherical portion of about 25 to 60 m/m in diameter therein, and the peripheral wall to which the branch pipe 2 or the branch joint fixture 3 is connected is at least about 15 m/m in thickness. The container itself is formed of various types of steel. Here, a spherical container 21 formed with a single flat surface 21-2 or a plurality of flat surfaces 21-2 at intervals on the inner surface of the peripheral wall and with a single or plurality of through holes 21-3 in abutment with the flat surfaces is taken as an example.

On the other hand, the branch connector such as the branch pipe 2 and the branch joint fixture 3 is formed of the same steel pipe member or a steel member as the cylindrical container 11 or the spherical container 21 having pipe diameter in the order of 20 m/m or less. The reference numerals 2-1 and 3-1 designate the flow paths.

The connecting structure shown in FIG. 1 is such that the connecting end 2-2 thereof, which has the same diameter as the branch pipe 2 itself, is joined (by means of brazing, diffusion bonding or the like) with the through hole 1-2 formed on the inner peripheral wall surface of the peripheral wall entending apially of the cylindrical container 1 having a cylindrical inner peripheral wall surface defining the flow path 11-1 therein in a state of being fitted therein.

Figure 23:
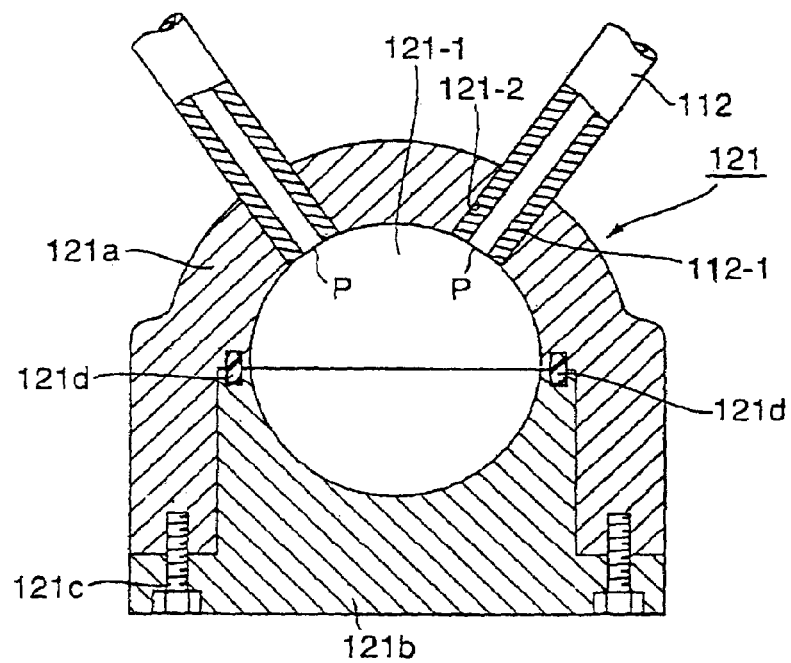
FIG. 23 is a cross sectional view showing an example of the connecting structure of the branch connector of the spherical-fuel container in the related art.
Figure 24:
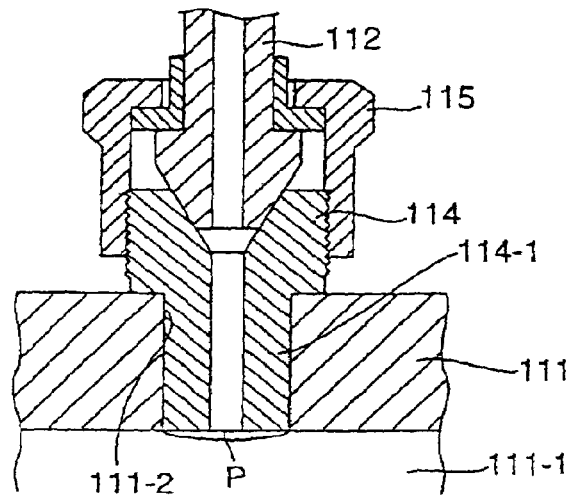
FIG. 24 is a drawing of the connecting structure employing a branch joint fixture as a branch connector in the connecting structure shown in FIG. 22, which corresponds to FIG. 2.
Figure 25:
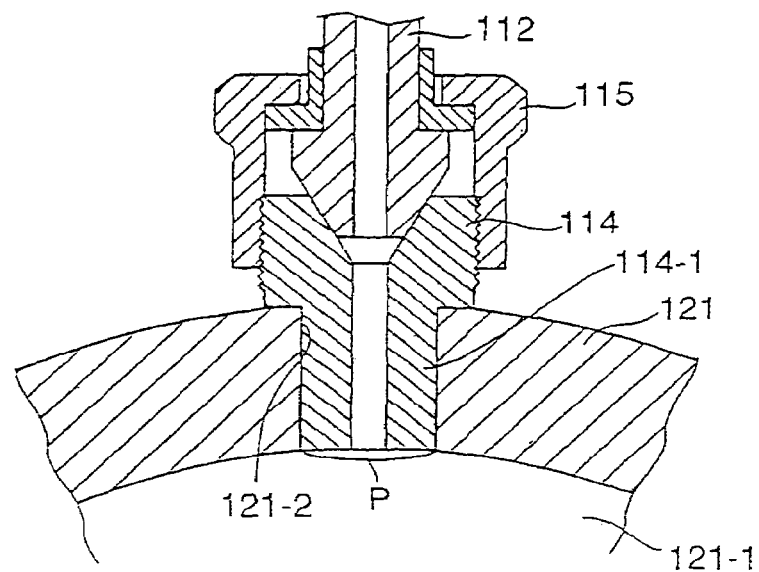
FIG. 25 is a drawing of the connecting structure employing a branch joint fixture as a branch connector in the connecting structure shown in FIG. 23, which corresponds to FIG. 9.
Figure 26:
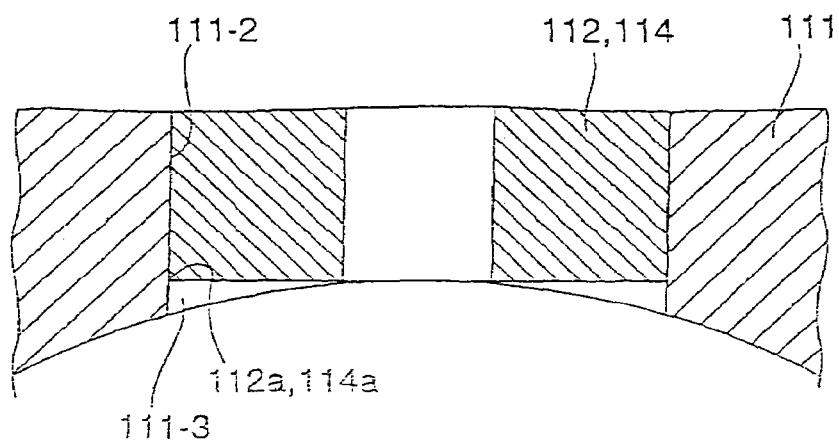
FIG. 26 is an enlarged cross sectional view showing a part of the connecting structure of the branch pipe or the branch joint fixture according to the connecting structure in the related art.

In this case, the connecting end 2-2 of the branch pipe 2 is connected by being inserted deeply into the through hole 1-2 until the distal end of the branch pipe 2 is projected from an inner peripheral wall surface 1-1a into the flow path 1-1 to form the projection 2-3 and joined by means of brazing or diffusion bonding. In this connecting structure, when forming the projection 2-3 by inserting the distal end of the branch pipe 2 into the through hole 1-2, the projection 2-3 is formed so that the recess 111-3 as shown in FIG. 23 is not formed.

Figure 2:
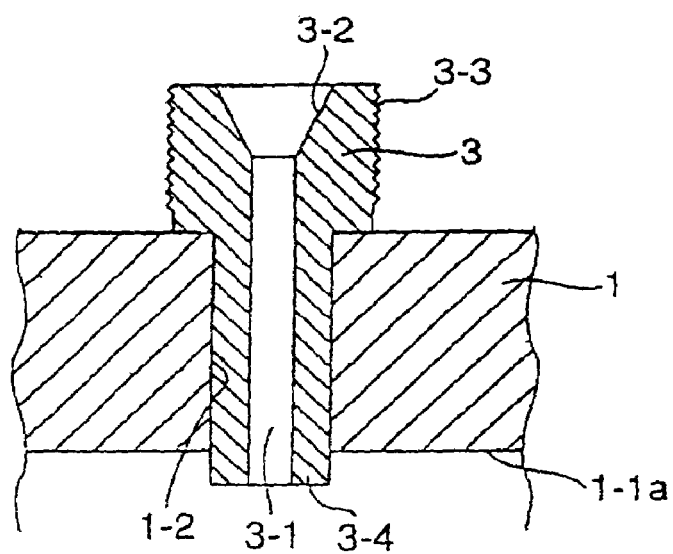
FIG. 2 is a cross sectional view showing a second embodiment of the connecting portion also using the branch

In the connecting structure shown in FIG. 2, the branch connector is formed of the branch joint fixture 3 instead of the branch pipe 2, and the branch joint fixture 3 is formed with the flow path 3-1 at the axle center by boring process such as drilling and the like, and applied with processes to form the pressure receiving bearing surface 3-2 opening outwardly in a trumpet shape on the outer end portion and the threaded wall 3-3, respectively. The straight cylindrical portion of the branch joint fixture 3 on the opposite side of the threaded wall 3-3 is joined by means of brazing or the like by being inserted deeply into the through hole 1-2 in the same manner as the branch pipe 2 until the distal end of the joint fixture 3 is projected into the flow path 1-1 from the inner peripheral wall surface 1-1a of the rail to form the projection 3-4.

Figure 3:
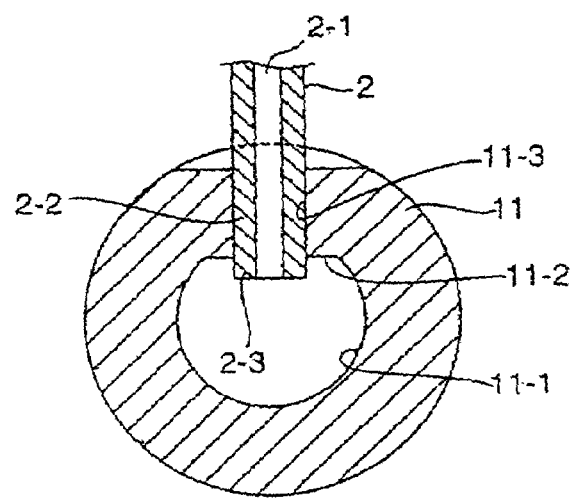
FIG. 3 is a cross sectional view of a connecting portion using the branch pipe having a flat surface on a part of the cylindrical inner peripheral wall surface according to a third embodiment.

The connecting structure shown in FIG. 3 is formed by applying a depressing force on the inner peripheral wall surface of the peripheral wall extending axially of the cylindrical container 11 having a cylindrical inner peripheral wall surface defining the flow path 11-1 therein under an external pressure system to form the flat surface 11-2, and forming the through hole 11-3 in abutment with the flat surface. The branch pipe 2 is to be connected in such a manner that the connecting end 2-2 thereof, which has the same diameter as the branch pipe 2 itself, is joined (by means of brazing, diffusion bonding or the like) with the through hole 11-3 in a state of being fitted therein. In this case, the connecting end 2-2 of the branch pipe 2 is connected by being inserted deeply into the through hole 11-2 until the distal end of the branch pipe 2 is projected from the flat surface 11-2 into the flow path 1-1 to form the projection 2-3 and joined with each other by means of brazing or diffusion bonding.

Figure 4:
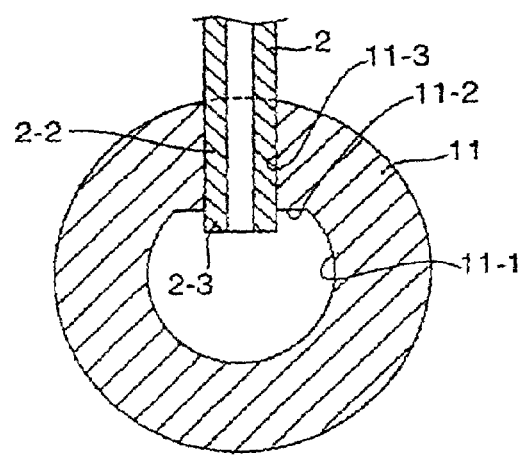
FIG. 4 is a cross sectional view of a connecting portion using the branch pipe having a flat surface on a part of the cylindrical inner peripheral wall surface according to a fourth embodiment.

The connecting structure shown in FIG. 4 is formed by providing the flat surface 11-2 on the inner peripheral wall surface of the peripheral wall extending axially of the cylindrical container 11 having the cylindrical inner peripheral wall surface defining the flow path 11-1 therein according to the method of forming a flat surface on the inner peripheral wall surface during injection molding. In this case as well, in the same manner as FIG. 3, the connecting end 2-2 thereof, which has the same diameter as the branch pipe 2 itself, is joined (by means of brazing, diffusion bonding or the like) with the through hole 11-3 formed in abutement with the flat surface 11-2 in a state of being fitted therein. In this case, the connecting end 2-2 of the branch pipe 2 is connected by being inserted deeply into the through hole 11-3 until the distal end of the branch pipe 2 is projected from the flat surface 11-2 into the flow path 11-1 to form the projection 2-3 and joined with each other by means of brazing or diffusion bonding.

Figure 5:
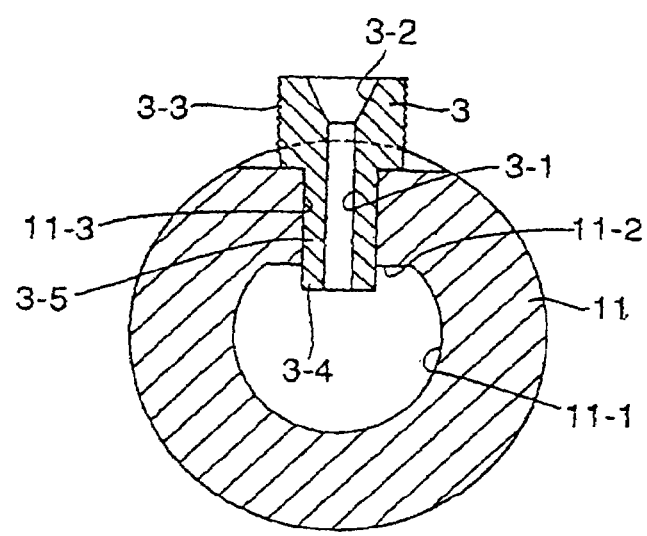
FIG. 5 is a cross sectional view of a connecting portion using the branch joint fixture having a flat surface on a part of the cylindrical inner peripheral wall surface according to a fifth embodiment.

The connecting structure shown in FIG. 5 is constructed of the branch joint fixture 3 shown in FIG. 2 as the branch connector instead of the branch pipe 2 described above, and is a system for connecting the branch pipe 2 to the cylindrical container 11 having the flat surface 11-2 formed by applying a depressing force under the external pressure system via the branch joint fixture 3 as in the case of the cylindrical container 11 shown in FIG. 3. In this case, the straight cylindrical portion 3-5 of the branch joint fixture 3 on the opposite side of the threaded wall 3-3 is joined by means of brazing or the like by being inserted deeply into the through hole 11-3 formed in abutment with the flat surface 11-2 in the same manner as the branch pipe 2 until the distal end of the joint fixture 3 is projected from the flat surface 11-2 into the flow path 11-1 to form the projection 3-4.

Figure 6:
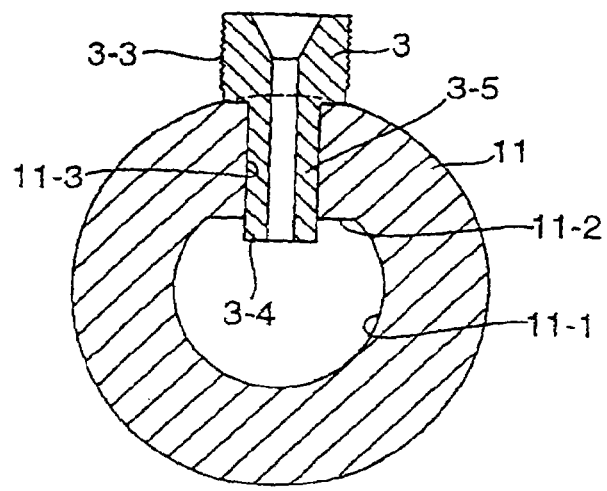
FIG. 6 is a cross sectional view of a connecting portion using the branch joint fixture having a flat surface on a part of the cylindrical inner peripheral wall surface according to a sixth embodiment.

The connecting structure shown in FIG. 6 is, as in the case of the cylindrical container 11 in FIG. 4, a system to connect the branch pipe 2 to the cylindrical container 11 formed with the flat surface 11-2 on the cylindrical inner peripheral wall surface defining the flow path 11-1 therein via the branch joint fixture 3 shown in FIG. 5 by the method of forming the flat surface on the inner peripheral wall surface during injection molding. In this case as well, the straight cylindrical portion 3-5 of the branch joint fixture 3 on the opposite side of the threaded wall 3-3 is joined by means of brazing or the like by being inserted deeply into the through hole 11-3 formed in abutment with the flat surface 11-2 in the same manner as the branch pipe 2 until the distal end of the joint fixture 3 is projected from the flat surface 11-2 into the flowpath 11-1 to form the projection 3-4.

Figure 7:
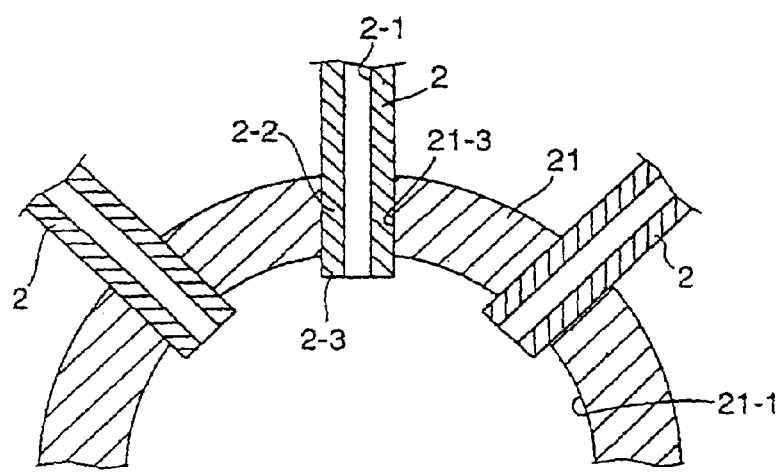
FIG. 7 is a cross sectional view of a connecting portion in the connecting structure using the branch connector in a spherical fuel container having a spherical inner peripheral wall surface having a flat surface on a part thereon according to a seventh embodiment.

The construction shown in FIG. 7 is formed with the through holes 21-3 on the spherical peripheral wall portion of the spherical container 21 having at least partly a spherical inner peripheral wall surface defining a spherical space 21-1 therein and the branch tube 2 is, in the same manner as the connecting structure shown in FIG. 1, to be connected in such a manner that the connecting end 2-2 thereof, which has the same diameter as the branch pipe 2 itself, is joined (by means of brazing, diffusion bonding or the like) with the respective through holes 21-3 in a spate of being fitted therein. In this case, the connecting end 2-2 on the branch pipe 2 is connected by being inserted deeply into the respective through holes 21-3 until the distal end or the branch pipe 2 is projected from the inner peripheral wall surface into the spherical space 21-1 to form the projection 2-3 and joined with each other by means of brazing or diffusion bonding.

Figure 8:
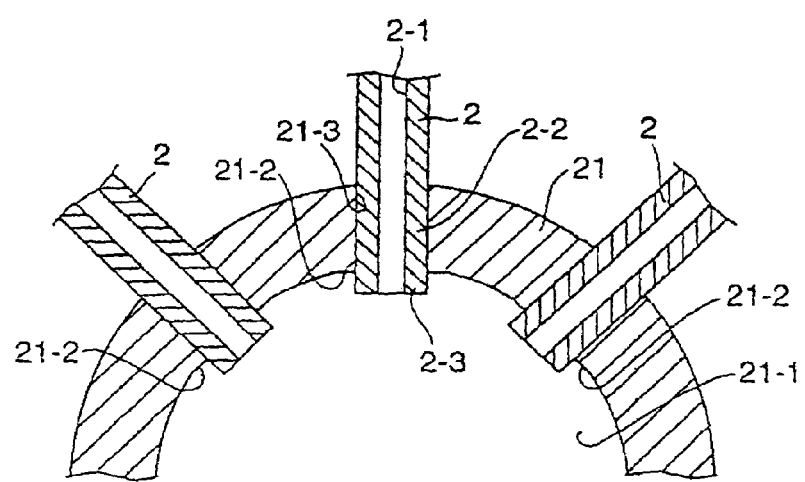
FIG. 8 is a cross sectional view of the connecting portion also using the branch pipe according to a eighth embodiment.

The connecting structure shown in FIG. 8 is provided with a flat surface 21-2 on the inner peripheral wall surface of the peripheral wall of the spherical container 21 having the spherical inner peripheral wall surface defining the spherical space 21-1 therein by a method of forming a flat surface on the inner peripheral wall surface when forging. In this case as well, in the same manner as FIG. 4, the connecting end 2-2 thereof, which has the same diameter as the branch pipe 2 itself, is joined (by means of brazing, diffusion bonding or the like) with the through hole 21-3 formed in abutment with the flat surface 21-2 in a state of being fitted therein. In this case, the connecting end 2-2 of the branch pipe 2 is connected by being inserted deeply into the through hole 21-3 until the distal end of the branch pipe 2 is projected from the flat surface 21-2 into the spherical space 21-1 to form the projection 2-3 and joined with each other by means of brazing or diffusion bonding.

Figure 9:
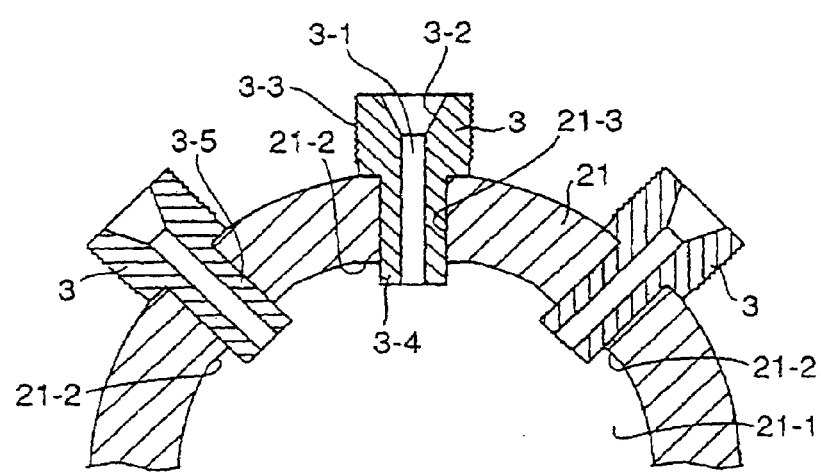
FIG. 9 is a cross sectional view showing a ninth embodiment of the connecting portion also using the branch joint fixture.

The structure shown in FIG. 9 is constructed of the branch joint fixture 3 as the branch connector instead of the branch pipe 2 described above. It is a system to connect the branch pipe 2 to the spherical container 21 with the flat surface 21-2 formed by applying a depressing force under the external pressure system via the branch joint fixture 3. In this case as well, as in the connecting structure shown in FIG. 5 and FIG. 6, the straight cylindrical portion 3-D of the branch joint fixture 3 on the opposite side of the threaded wall 3-3 is joined by means of brazing or the like by being inserted deeply into the through hole 21-3 formed in abutment with the flat surface 21-2 in the same manner as the branch pipe 2 until the distal end of the joint fixture 3 is projected from the flat surface 21-2 into the spherical space 21-1 to form the projection 3-4.

Figure 10:
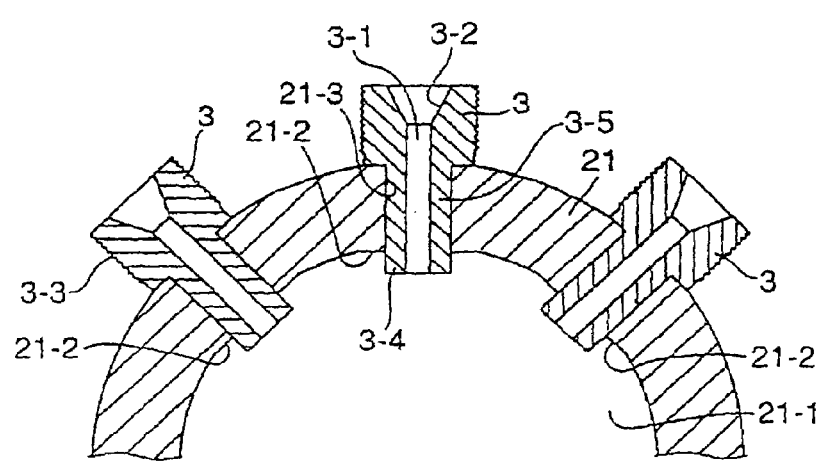
FIG. 10 is a cross sectional view showing a tenth embodiment of the connecting portion also using the branch joint fixture.

The connecting structure shown in FIG. 10 is as in the case of the spherical container 21 shown in FIG. 8, is a system to connect the branch pipe 2 to the spherical container 21 formed with a flat surface 21-2 on the spherical inner peripheral wall surface via the branch joint fixture 3 shown in FIG. 9. In this case as well, the straight cylindrical portion 3-5 of the branch joint fixture 3 on the opposite side the threaded wall 3-3 is joined by means of brazing or the like by being inserted deeply into the through hole 21-3 formed in abutment with the flat surface 21-2 in the same manner as the branch pipe 2 until the distal end of the joint fixture 3 is projected from the flat surface 21-2 into the spherical space 21-1 to form the projection 3-4.

Figure 11A:
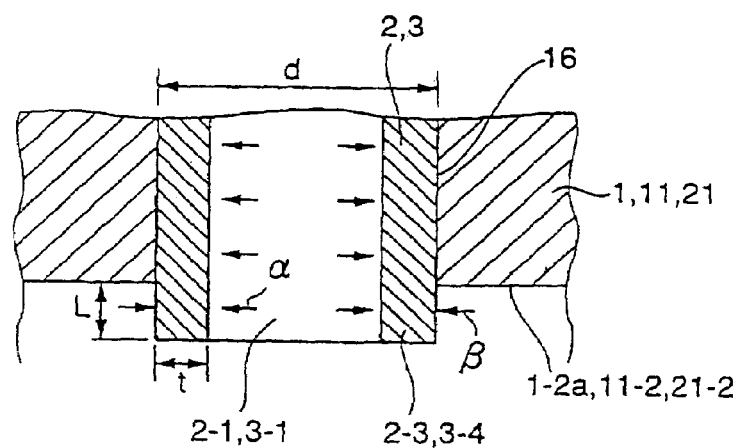
FIG. 11A is an explanatory drawing illustrating a projecting length L of the branch connector in the cylindrical fuel container and a spherical fuel container to the interior of the pressure accumulating container and the action of reducing a fatigue stress.
Figure 11B:
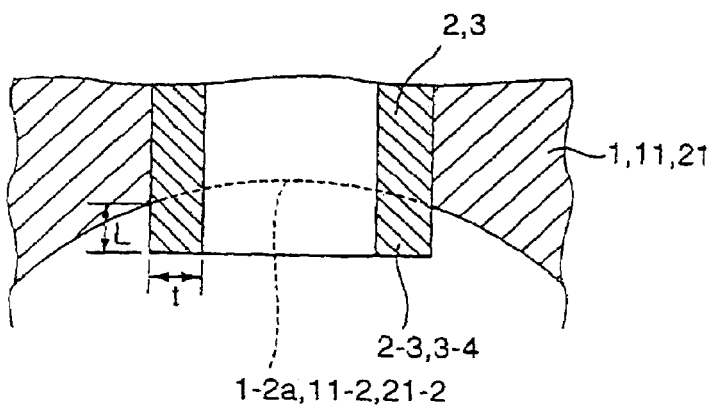
FIG. 11B is an explanatory drawing illustrating a projecting length L of the branch connector in the cylindrical fuel container to the interior of the container.

The respective lengths L of the projections 2-3 and 3-4 of the branch pipe 2 and the branch joint fixture 3 in the connecting structure shown in FIG. 1 to FIG. 10 are the lengths from the inner peripheral wall surface 1-1$a$ and from the flat surfaces 11-2, 21-2 as shown in FIG. 11A, or the lengths from inner peripheral wall surface shown in FIG. 11B (since the widths of the flat surface 11-2 in the case of the cylindrical container 1, and the width of the flat surface 21-2 in the case of the spherical container may be shorter than the diameters d of the through holes 11-3 and 21-3), and the length L of the projection to the interior of the pressure accumulating container is preferably not less than the thickness t of the branch pipe 2 or the branch joint fixture 3.

Figure 12:
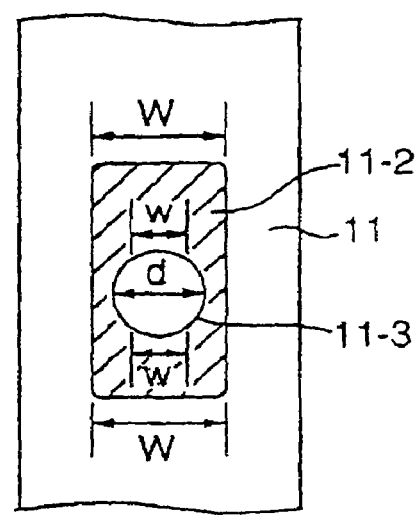
FIG. 12 is a conceptual diagram illustrating a flat surface of the cylindrical fuel container having a cylindrical inner peripheral wall surface therein.
Figure 13:
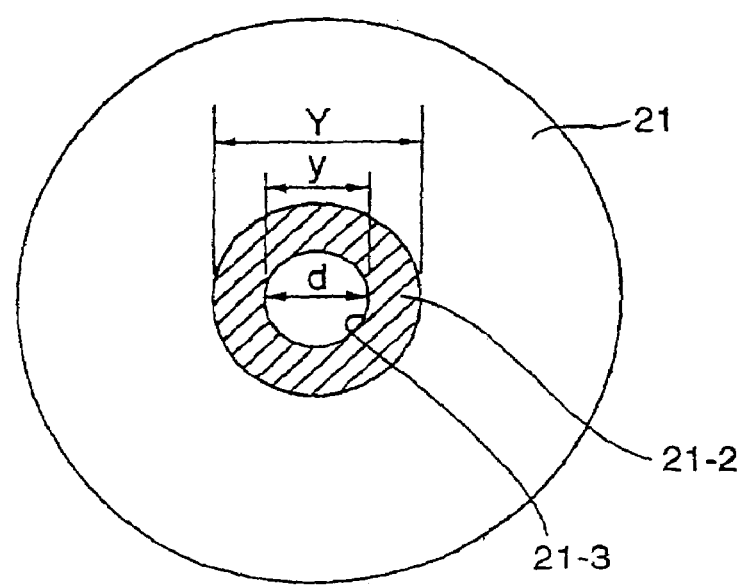
FIG. 13 is a conceptual diagram illustrating the flat surface in the spherical fuel container having a spherical inner peripheral wall surface therein.

FIG. 12 and FIG. 13 are explanatory drawings illustrating the flat surface of the cylindrical fuel container and the spherical fuel container, respectively. In other words, since the stress-concentrated points P may be generated axially of the cylindrical fuel container, which means that the position thereof has directionality in the case of the cylindrical fuel container as described above, the flat surface 11-2 is to be formed at least axially of the cylindrical container, and dimensions thereof are such that, as shown in FIG. 12, the maximum dimension W of the flat surface in the direction orthogonal to the axis is preferably larger than half the diameter d of the through hole 11-3, and the minimum dimension w thereof is not more than twice the diameter d of the through hole 11-3. Accordingly, in the case of the cylindrical fuel container, the shadowed portion corresponds to the region to form the flat surface.

On the other hand, in the case of the spherical fuel container, the stress-concentrated point P does not have directionality, and thus the flat surface 21-2 may be formed concentrically with the through hole 21-3. The dimensions thereof are such that, as shown in FIG. 13, the minimum dimension y of the flat surface in the direction of radius of the through hole is preferably larger than the 1.1 times the diameter d of the through hole 21-3, and the maximum dimension Y thereof is not more than twice the diameter d of the through hole. Therefore, in the case of the spherical fuel container, the shadowed portion around the through hole 21-3 is the region to form the flat surface. The flat surface of the spherical fuel container is almost ring-shaped flat surface.

According to the invention, since the distal ends of the branch pipe 2 and the branch joint fixture 3 are inserted from the inner peripheral wall surface or the flat surface 11-2 of the cylindrical containers 1 and 11 and the inner peripheral wall surface or the flat surface 21-2 of the spherical container 21 into the flow path 1-1, 11-1 and the spherical space 21-2 respectively to form the projection 2-3, 3-4 as described above, the internal pressure shown by an arrow α is applied to the walls of the connecting ends of the branch pipe 2 and the branch joint fixture 3 including the projections as shown in FIG. 11. Simultaneously, the external pressure (arrow β) that is equivalent to the internal pressure is applied to the outer wall of the projection 2-3, 3-4. As a consequence, the internal pressure and the external pressure are counterbalanced, and thus little tensile stress is generated at the opening ends of the cylindrical container 1, 11 and the spherical container 21 of the branch pipe 2 and the branch joint fixture 3. In addition, since the branch pipe 2 and the branch joint fixture 3 are secured on the flat surface 11-2, 21-2, stress-concentrated point is not generated. In addition, the brazing filler material 16 at the joint portion (or the diffused joint) between the branch pipe 2 and the branch joint fixture 3 and the cylindrical container 1, 11 and the spherical container 21 is increased in drawing resistance by being compressed by the pressure from the flow path 2-1, 3-1 of the branch pipe 2 or the branch joint fixture 3 through the wall of the branch pipe 2 or the branch joint fixture 3

Figure 14:
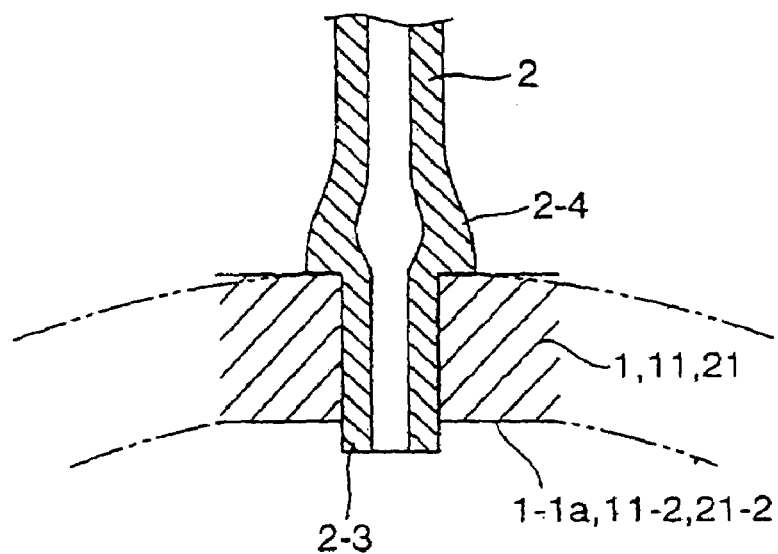
FIG. 14 is a cross sectional view of the connecting portion using the branch pipe according to another embodiment of the invention.

The connecting structure shown in FIG. 14 is such that the integrally formed enlarged diameter portion 2-4 is formed on the branch pipe 2 at the positions that comes into abutment with the outer peripheral surface of the cylindrical container 1, 11 and the spherical container 21 and is joined therewith. In the case of this branch pipe 2, since a function as a stopper may be provided by the integrally formed enlarged diameter portion 2-4, by selecting the position to provide this integrally formed enlarged diameter portion 2-4, the length of the projection 2-3 inserted through the through hole 1-2, 11-3, 21-3 of the cylindrical container 1, 11 and the spherical container 21 may be determined easily and accurately.

Figure 15:
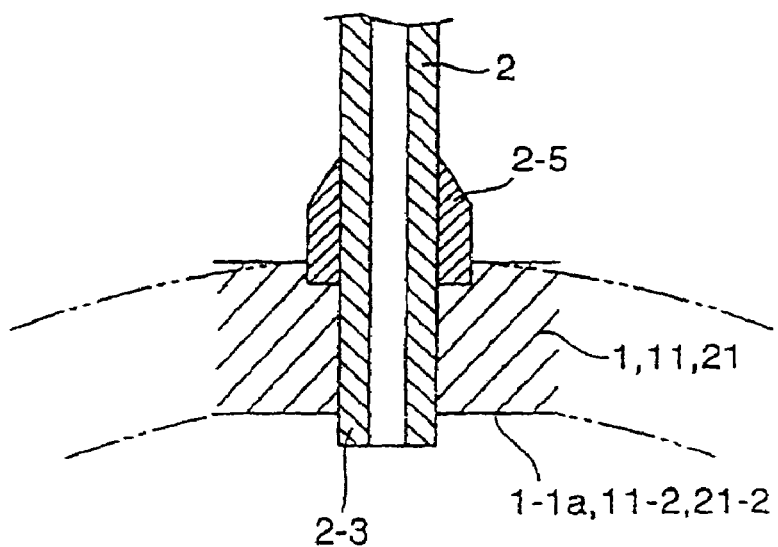
FIG. 15 is a cross sectional view showing still another embodiment of the connecting portion using the branch pipe.

The connecting structure shown in FIG. 15 is such that the separately formed enlarged diameter portion 2-5 is fixedly fitted on the branch pipe 2 at the positions that come into abutment with the outer peripheral surface of the cylindrical container 1, 11 and the spherical container 21 and joined therebetween instead of the integrally formed enlarged diameter portion 2-4 shown in FIG. 14. In this case as well, as in the connecting structure shown in FIG. 14, by selecting the position to provide the separately formed enlarged diameter portion 2-5, the length of the projection 2-3 of the branch pipe 12 formed in the flow path 1-1 by being inserted through the through hole 1-2, 11-3, 21-3 of the spherical container 21 may be determined easily and accurately. The means for fixing the separately formed enlarged diameter portion 2-5 includes brazing, diffusion bonding, welding, and so on.

Figure 16:
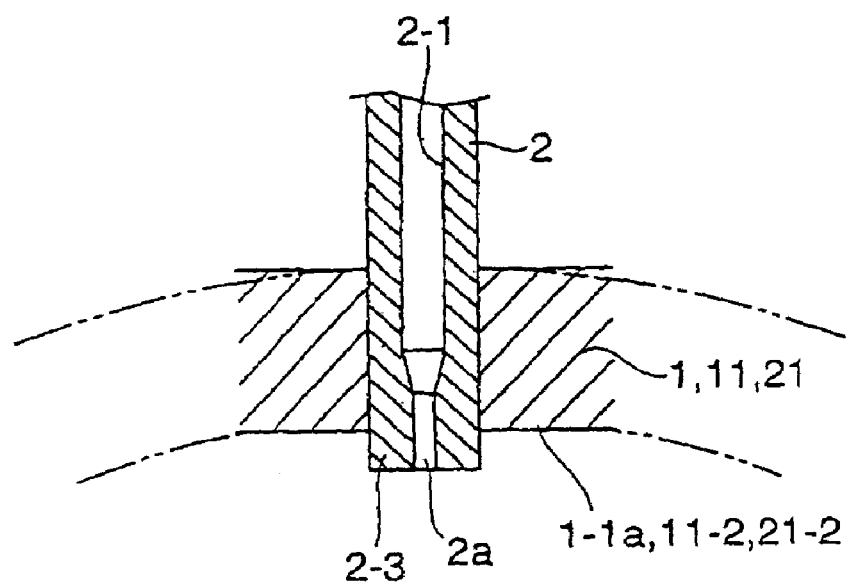
FIG. 16 is a cross sectional view showing still another embodiment of the connecting portion using the branch pipe.
Figure 17:
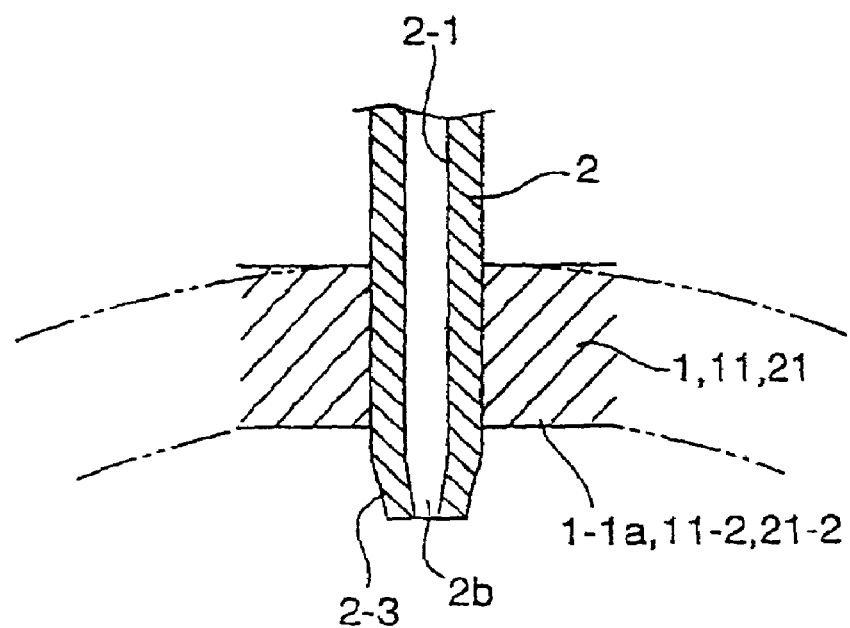
FIG. 17 is a cross sectional view showing still another embodiment of the connecting portion using the branch pipe.

In the connecting structure shown in FIG. 16 and FIG. 17, the orifices 2a and 2b are formed on the distal end or the projection 2-3 of the branch side 2 for ensuring smooth flow of fluid and preventing pulsation due to injection to the engine, respectively. The branch pipe 2 shown in FIG. 16 is formed with the orifice 2a by reducing the diameter of the flow path 2-1 at the distal end while maintaining the outer diameter as it is, and the branch pipe 2 shown in FIG. 17 is formed with the orifice 2b by reducing the diameter of the flow path 2-1 at the distal end with the outer diameter reduced. Both of these connecting structures are formed in such a manner that the connecting end 2-2 of the branch pipe 2 is inserted deeply into the through hole 1-2, 11-3, 21-3 until the distal end of the branch pipe 2 is projected into the flow path 1-1, 11-1 of the cylindrical container 1, 11 to form the projection 2-3 and joined with each other by means of brazing or the like as described above.

Figure 18:
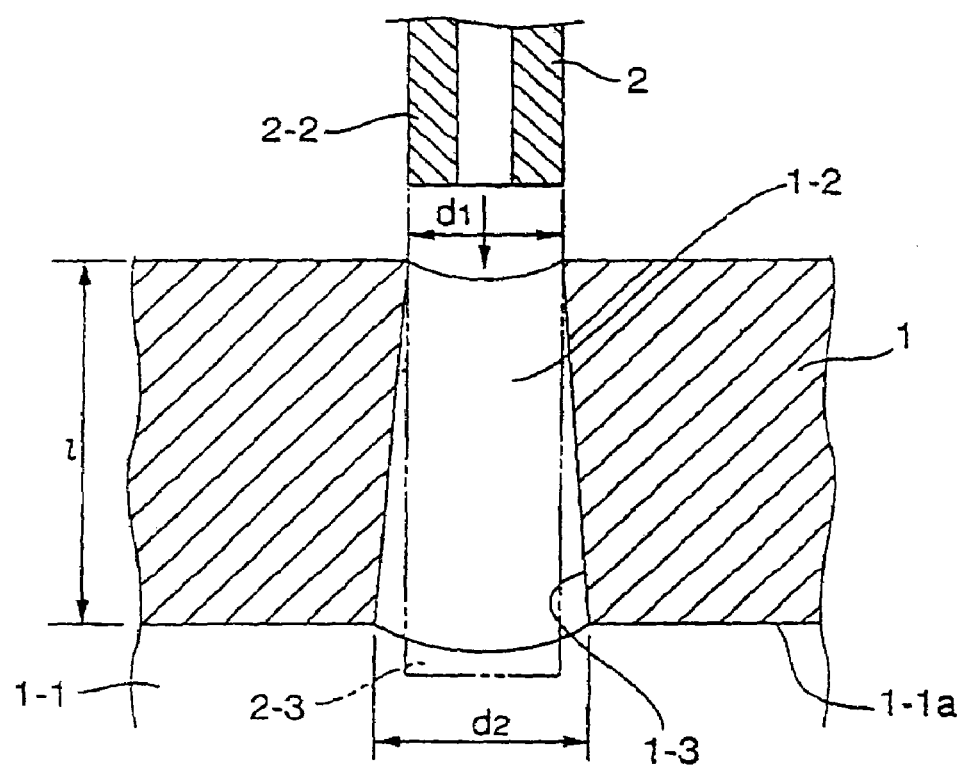
FIG. 18 is a connecting through hole and a branch pipe of the connecting structure according to another embodiment of the invention.

In the connecting structure as shown in FIG. 18, the through hole 1-2 to be formed with the cylindrical container 1 is replaced with the tapered through hole 1-3 which increases in diameter toward the inner peripheral wall surface 1-1a of the rail, and that corresponds to the branch connector is joined by means of brazing or the like with the tapered through hole 1-3 in such a manner that the connecting end 2-2 of the branch pipe 2 is inserted deeply into the tapered through hole 1-3 until the distal end of the branch pipe 2 is projected from the inner peripheral wall surface 1-1a of the rail into the flow path 1-1. In this case, the branch pipe 2 is press-fitted, shrink-fitted, or cool-fitted into the through hole 1-3 before being joined by brazing with each other.

Regarding diameters $d_1$ and $d_2$ of the tapered through hole 1-3 and the thickness 1 of the cylindrical container 1, when the working pressure is 2000 bar, $d_1$ is 6.35 mm, and 1 is 7 mm, for example, $d_2$ is in the order of $d_1+2-3$ μm.

In this connecting structure, since the through hole 1-3 has a tapered shape that increases in diameter toward the inner peripheral wall surface 1-1a of the rail, the diameter of the branch pipe 2 is increased by the internal pressure applied on the inner wall of the connecting end 2-2 of the branch pipe 2 and hence is deformed along the through hole 1-3, and a large drawing resistance may be obtained.

Figure 19:
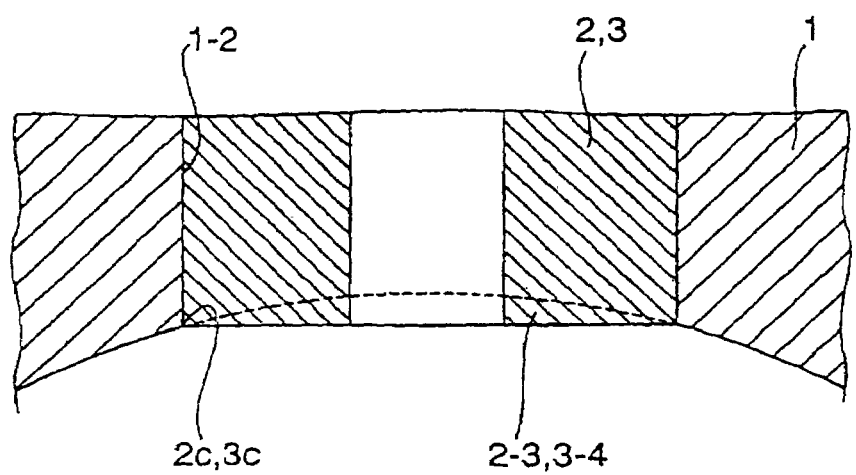
FIG. 19 is an enlarged cross sectional view showing a part of a connecting structure of the branch pipe or the branch joint fixture according to the connecting structure of the branch connector according to the invention.

In the case of the connecting structure according to the invention described above, the distal end of the branch pipe 2 or the branch joint fixture 3 may be joined by being fitted into the through hole 1-2 so that the outer peripheral edge 2c, 3c of the branch pipe 2 or the branch joint fixture 3 abuts to the inner peripheral wall surface of the cylindrical container 1, 11 or the spherical container 21 as shown in FIG. 19. In this case, the projection 2-3, 3-4 is formed only in the direction of the axis of the pipe.

Figure 20:
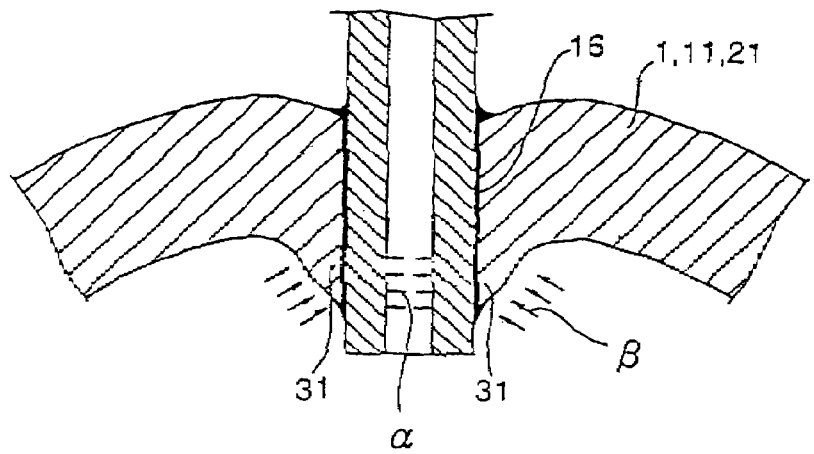
FIG. 20 is a cross sectional view of the connecting portion using the branch pipe according to a eleventh embodiment of the invention.
Figure 21:
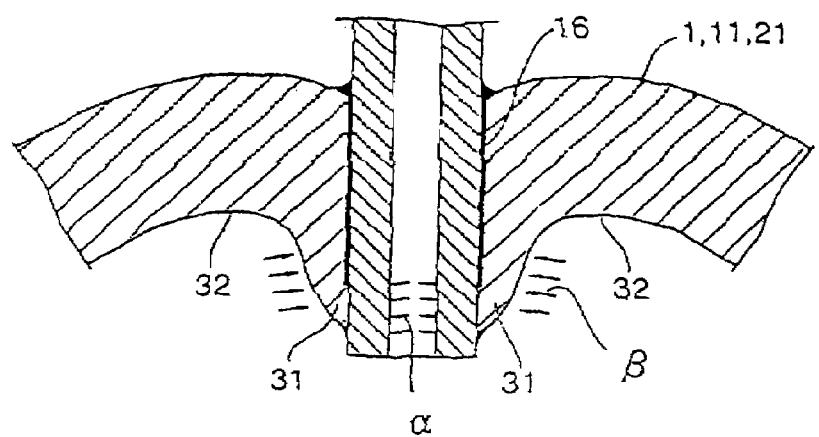
FIG. 21 is a cross sectional view of the connecting portion using the branch pipe according to a twelfth embodiment of the invention.
Figure 22A:
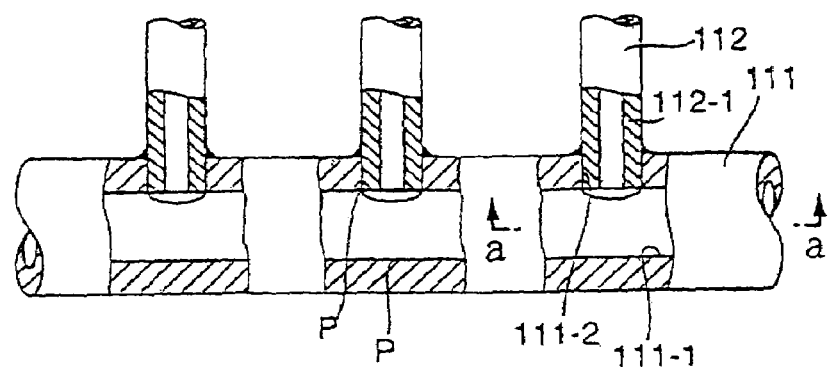
FIG. 22A is a partly broken side view of the connecting structure of the branch connector in the cylindrical fuel container in the related art.
Figure 22B:
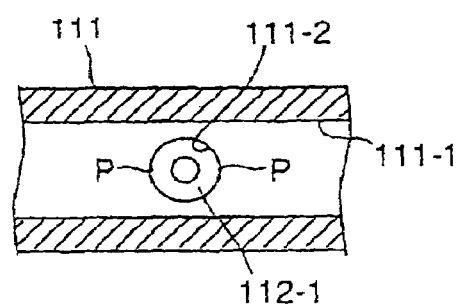
FIG. 22B is a cross sectional view taken along the line a—a in FIG. 22A.

In the connecting structures of the invention shown in FIG. 1 to FIG. 19, since the distal ends of the branch pipe 2 and the branch joint fixture 3 are inserted respectively through the inner peripheral wall surface and the flat surface 11-2 of the cylindrical containers 1 and 11, and the inner peripheral wall surface and the flat surface 21-2 of the spherical container 21 into the flow path 1-1, 11-1 and into the spherical space 21-1 to form the projection 2-3, 3-4, respectively, the internal pressure (indicated by the arrow α) and the external pressure (indicated by the arrow β) are counterbalanced as shown in FIG. 11. As a consequence, little tensile stress is generated at the opening end of the cylindrical containers 1, 11 and the spherical container 21 of the branch pipe 2 and the branch joint fixture 3, and also a tensile strength applied on the brazing filler material 16 (or the portion of diffusion bonding) is reduced so that a large drawing resistance may be achieved. Another embodiment of the invention shown in FIG. 20 and FIG. 21 is a connecting structure for reducing a tensile strength applied on the brazing filler material 16 (or diffusion bonding) near the burring wall 31 by forming a burring wall 31 at the inner opening end of the through hole of the cylindrical container 1, 11 or the spherical container 21 instead or the projection 2-3, 3-4 at the distal end of the branch pipe 2 or the branch joint fixture 3, and counterbalancing an external pressure (indicated by an arrow β) applied on the burring wall 31 and the internal pressure (indicated by an arrow α) from the branch pipe 2 or the branch joint fixture 3. In addition, as shown in FIG. 21, reduction of the tensile strength applied on the brazing filler material (or diffusion bonding) and further alleviation of concentrated stress may be achieved by forming a flat surface 32 as shown in FIG. 3 or FIG. 8 on the inner peripheral wall surface around the base portion or the burring well 31.

A method of forming the burring wall 31 may be a method including the steps of forming a small hole on the cylindrical container 11, 1 or on the spherical container 21, and subsequently driving a punch into the small hole. On the other hand, a method of forming the flat surface 32 may be the method of forming under the external pressure system or the method of forming the flat surface when forging or during injection molding as described above.

The joining means of the branch connector such as the branch pipe 2 and the branch joint fixture 3 in the invention is preferably brazing in the furnace such as copper brazing and nickel brazing. It is also possible to achieve diffusion bonding by activating the surface of the through hole 1-2, 11-3, 21-3 and the branch connector such as the branch pipe 2 and the branch joint fixture 3 by a process before finishing with high accuracy, and then preferably, applying metal plate coating such as nickel and copper, inserting the branch connector into the through hole, and maintaining it at the diffusing temperature for a sufficient period of time.

As described thus far, the connecting structure of the branch connector in the cylindrical fuel pressure accumulating container or the spherical fuel pressure accumulating container according to the invention is a connecting structure in which the distal end of the branch connector such as the branch pipe and the branch joint fixture is joined with the pressure accumulating container by being inserted into the interior thereof and the projection is secured by brazing. Therefore, the external pressure that is almost equivalent to the internal pressure is applied on the outer wall portion of the projection to counterbalance both of them, and as a consequence, the fatigue stress at the opening end P of the pressure accumulating container of the branch connector may significantly be alleviated, and simultaneously, a large drawing resistance may be achieved since the brazing filler material of the joint portion or the diffused joint between the branch connector and the pressure accumulating container are compressed by the internal pressure applied on the branch connector. In addition, since a system of forming a flat surface on the inner peripheral surface of the cylindrical container or the spherical container and connecting the branch connector into the through hole formed in abutment with the flat surface is employed, generation of a stress-concentrated point such as the point P may be prevented, and further reduction of the fatigue stress at the opening end of the pressure accumulating container may be achieved. Therefore, according to the invention, a connecting structure of the high-pressure branch connector having a high internal pressure fatigue characteristics may be provided advantageously at low costs even with heat treatment such as brazing and diffusion bonding associated with the manufacturing process.

What is claimed is:

1. A connecting structure of a branch connector in a fuel pressure accumulating container for supplying fuel at a pressure of not less than 1000 kgf/cm$^2$, comprising: a substantially cylindrical fuel container having an axially extending peripheral wall defining an internal flow path with an inner peripheral surface that is cylindrical along portions of the peripheral wall, at least one through hole formed through the axially extending peripheral wall of the cylindrical fuel container so that the through hole communicates with the internal flow path of the cylindrical fuel container; a burring wall formed unitarily with the peripheral wall at an inner opening end of the through hole so that portions of the inner peripheral surface around the through hole are arcuately convex; and a branch pipe or a branch joint fixture being inserted into the through hole and a brazed material or a diffusion-bonded layer between the branch pipe or the branch joint fixture and the cylindrical fuel container at both the through hole and the burring wall for joining the branch pipe or the branch joint fixture to a cylindrical fuel container at the through hole and the burring wall, and the branch connector being inserted sufficiently deeply into the through hole for the distal end of the branch connector to project from the arcuately convex burring wall into the flow path.

2. A connecting structure of a branch connector in a fuel pressure accumulating container according to claim 1, wherein a flat surface extends between the arcuately convex burring wall and the cylindrical inner peripheral surface.

3. A connecting structure of a branch connector in a fuel pressure accumulating container according to claim 1, wherein the branch connector is press-fitted, shrink-fitted, or cool-fitted, before joining.

4. A connecting structure for supplying fuel at a pressure of not less than 1000 kgf/cm$^2$ to a fuel pressure accumulating container having a curved peripheral wall with inner and outer peripheral surfaces, portions of the inner peripheral surface being concavely arcuate and defining an interior within the fuel pressure accumulating container, the connecting structure comprising: at least one cylindrical through hole formed through the peripheral wall and communicating with the interior; a burring wall formed unitarily with the peripheral wall at an inner opening end of the through hole so that portions of the inner peripheral surface around the through hole are arcuately convex; and a branch connector inserted into the through hole, the branch connector having a proximal end externally of the fuel pressure accumulating container, a distal end, a branch flow path extending linearly through the branch connector from the proximal end to the distal end, and a brazed material or a diffusion-bonded layer extending between a cylindrical outer surface of the branch connector and the peripheral wall at both the cylindrical through hole and the burring wall so that the cylindrical outer surface is joined to the burring wall at the through hole by brazing or diffusion bonding and extending to the distal end, portions of the branch connector in the through hole defining a substantially uniform radial thickness, the branch connector being inserted sufficiently deeply into the through hole so that the distal end thereof is projected from the inner peripheral surface at the burring wall of the container into the interior of the container.

5. The connecting structure of claim 4, wherein a flat surface extends between the arcuately convex burring wall and the cylindrical inner peripheral surface.

6. The connecting structure of claim 4, wherein the branch connector is press-fitted, shrink-fitted, or cool-fitted, before joining.

7. The connecting structure of claim 4, wherein the burring wall is tapered to reduced radially thickness at further distances from the peripheral wall.

8. The connecting structure of claim 1, wherein the burring wall is tapered to reduced radial thickness at further distances from the peripheral wall.

9. The connecting structure of claim 1, wherein the brazed material is nickel or copper.

10. The connecting structure of claim 4, wherein the brazed material is nickel or copper.

11. The connecting structure of claim 1, wherein portions of the branch pipe or branch joint fixture in the through hole and portions of the branch pipe of branch joint fixture projecting into the flow path have outside diameters that are equal.

12. The connecting structure of claim 4, wherein portions of the branch connector in the through hole and portions of the branch connector projecting into the container have substantially equal outside diameters.

* * * * *